Figure 1:
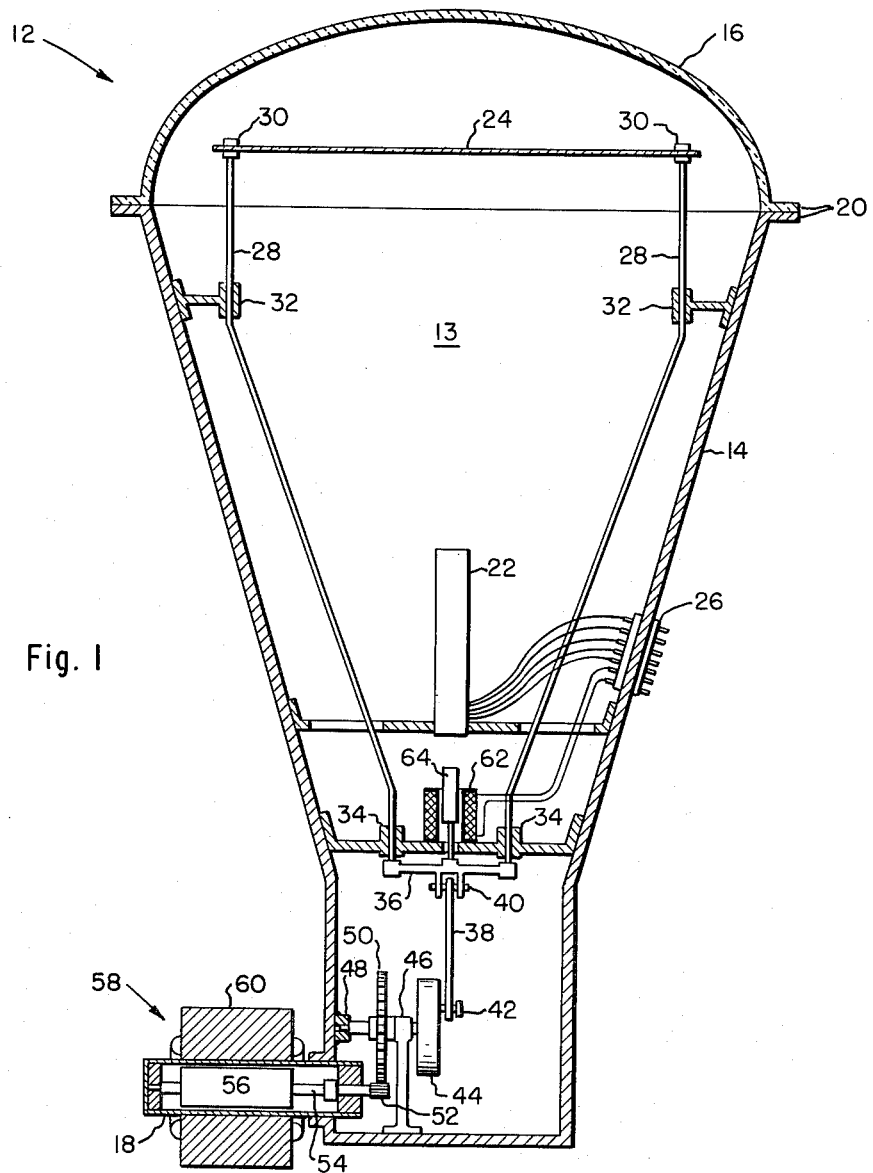

June 23, 1964     E. L. WITHEY     3,138,796

THREE-DIMENSIONAL DISPLAY APPARATUS

Filed Sept. 3, 1958     2 Sheets-Sheet 1

*INVENTOR.*
EDWARD L. WITHEY

BY

KENWAY, JENNEY, WITTER & HILDRETH

ATTORNEYS

June 23, 1964   E. L. WITHEY   3,138,796
THREE-DIMENSIONAL DISPLAY APPARATUS
Filed Sept. 3, 1958   2 Sheets-Sheet 2

INVENTOR.
EDWARD L. WITHEY
BY
KENWAY, JENNEY, WITTER & HILDRETH
ATTORNEYS

United States Patent Office 3,138,796
Patented June 23, 1964

3,138,796
THREE-DIMENSIONAL DISPLAY APPARATUS
Edward L. Withey, Brighton, Mass.
(Laurel Drive, Lincoln, Mass.)
Filed Sept. 3, 1958, Ser. No. 758,749
15 Claims. (Cl. 343—7.9)

The present invention relates generally to cathode ray display apparatus and more particularly to apparatus having a display tube with a transparent window permitting observation of a three-dimensional display within the evacuated envelope of the tube.

Three-dimensional cathode ray display apparatus has been discussed hitherto as a theoretical possibility and some experimental work has been done. A number of practical applications may be envisioned. Such applications, however, have not been practical hitherto largely because of difficulty in the design of a suitable cathode ray device capable of three-dimensional display.

One application which is further discussed below relates to air traffic intelligence and control and envisions the use of a ground radar to display position data for aircraft over a given area in a Z-dimension representing altitude as well as in X and Y dimensions.

A principal object of the present invention is to provide a three-dimensional cathode ray display tube, in which the display is produced within the evacuated envelope of the tube by an electron beam impinging upon a screen coated with a suitable phosphor.

Another object is to provide such a display tube which is further characterized by relatively silent operation.

A further object is to provide such a display tube which is further adapted to accommodate various circuit techniques to permit the introduction of adjustable coordinate and beam diameter corrections, whereby the X and Y coordinates of a displayed pattern may be rendered independent of the Z coordinates to give a true three-dimensional pattern.

With the foregoing and other objects in view the principal feature of this invention resides in a novel construction for a three-dimensional display tube, in which a display screen is physically oscillated in the Z-dimension within the evacuated envelope of the tube. Because of the absence of air friction, extremely fast oscillations of the screen over considerable amplitudes are made possible with good uniformity of frequency and amplitude, low power consumption and low noise level.

A second feature resides in the inclusion of feedback means within the envelope of the tube, whereby an electrical signal in predetermined time and phase relation to the Z-position of the screen is generated.

A further feature, which results from the inclusion of the physical oscillation means within the envelope of the tube, is that the moving parts within the tube generate little audible sound because of the absence of air therein.

Thus the only means whereby sound generated within the tube can be transmitted therefrom is through the vibration of a few parts physically connected to the walls thereof.

Other features reside in certain features of construction and in arrangements of the parts and modes of operation hereinafter more fully described with reference to a preferred embodiment thereof, having reference to the appended drawings illustrating the same.

Figure 3:
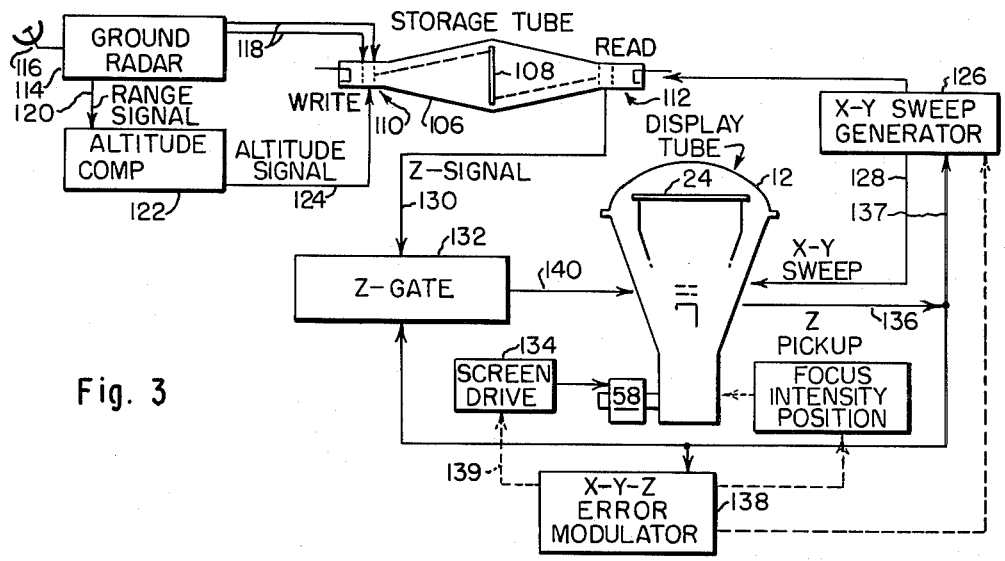
Figure 2:
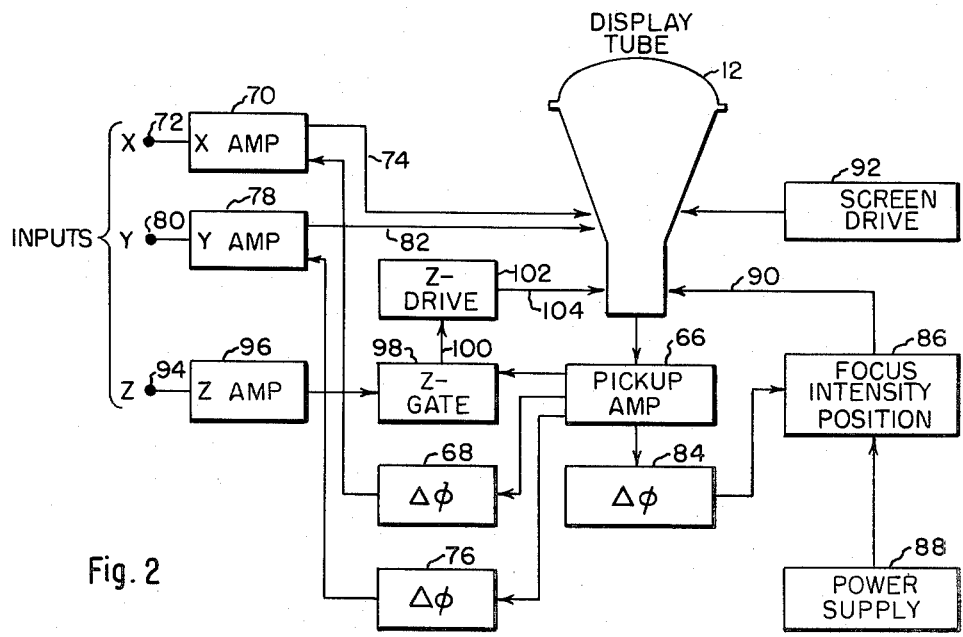

In the drawings, FIG. 1 is a side elevation in section of the improved display tube according to this invention;

FIG. 2 is a block diagram illustrating the employment of circuitry suitable to generate a three-dimensional display in the tube of FIG. 1; and FIG. 3 is a block diagram illustrating a specific application of the display tube to the field of air traffic intelligence and control.

Referring to FIG. 1, the improved display tube designated generally at 12 has an hermetically-sealed, evacuated envelope 13 formed by a base portion 14, a viewing window 16 and a closed-ended cylindrical rotor housing 18, all secured together hermetically by any of the usual techniques and evacuated in accordance with prevailing practice in cathode-ray display apparatus of the two-dimensional type.

The base portion 14 is preferably constructed of non-magnetic metal, for example stainless steel or brass, but it may be constructed of glass or other rigid non-porous material. The window 16 is preferably constructed of transparent glass to permit observation of the three-dimensional display which is produced within the envelope generally above flanges 20 by which the window is secured to the base portion 14.

An electron gun 22 of conventional construction directs a beam of electrons on to a screen 24 coated with a suitable phosphorescent material. The gun is connected with the outside of the tube by an hermetically sealed header 26 provided with lugs extending therethrough and wired to the gun. In accordance with conventional construction, the gun includes X- and Y- deflection plates, a focus-controlling anode and a control grid by means of which the electron beam may be turned "on" and "off."

The screen 24 is preferably flat and of light weight. It may be, for example, a sheet of mica of circular shape having a thickness of about one millimeter and a diameter of 18 centimeters. The corresponding amplitude of the oscillations of the screen between extreme positions may be three centimeters although greater amplitudes may be used if desired.

The screen is supported upon a plurality of relatively rigid metallic drive rods 28 each of which is secured to the screen at one end as indicated at 30.

Each drive rod passes through an upper bushing 32 and a lower bushing 34, the bushings being secured to the inside surface of the base portion 14. Opposite the screen 24 the rods 28 are secured to a drive plate 36. The plate 36 is pivotally attached to an end of a crank rod 38 by means of a pin 40. The other end of the crank rod is connected by a crank pin 42 to a flywheel 44 rotatably supported in bearings 46 and 48 attached to the lower end of the base member 14. A spur gear 50 is engaged with a pinion 52 on a shaft 54 supported in bearings within the rotor housing 18. The shaft 54 supports a rotor 56. As previously stated, the entire space within the rotor housing 18 is evacuated since it communicates with the main envelope of the tube through the bearings of the shaft 54.

The rotor 56 comprises the rotating element of an alternating-current motor designated generally at 58, having a stator winding 60 outside the tube envelope. An important advantage of this construction is that it permits better dissipation of the heat generated within the stator winding during operation.

From the foregoing description, it will be apparent that all of the moving parts associated with the screen 24 are within the evacuated envelope 13. The absence of air friction reduces the power required to oscillate the screen and improves the uniformity of frequency of the oscillations. Also, most of the heat is generated in the stator winding, but this is outside the evacuated envelope and may be readily dissipated.

In operation, the motor 58 is supplied by a continuous alternating current voltage to its stator winding 60, whereby the rotor 56 revolves continuously at fixed speed, driving the flywheel 44 through a gear reduction and causing the screen 24 to oscillate through the crank rod connection.

It will be observed that certain conditions are imposed upon the operation of the tube. First, assume that a specified object in space is to be represented by a bright dot at a corresponding position within the volume swept out cyclically by the screen 24. The dot may be made visually persistent only by causing the electron beam to be gated momentarily to cause it to impinge at the same spot on the screen each time the latter passes through the corresponding Z-position on a plurality of cycles of oscillation. Obviously, the beam gate must be short in comparison with the period of screen oscillation. From this it will be seen that the screen should perferably oscillate at a frequency equal to or greater than the flicker fusion frequency of the eye. Also, to avoid producing a dot of elongated form in the Z-dimension, it is necessary that the persistence of the screen phosphor be short in comparison with the period of screen oscillation. A phosphor having a short decay characteristic, whereby the light output is limited to essentially the same duration as the beam gate, is preferred.

It will be obvious from FIG. 1 that for any given fixed X- and Y-coordinate deflections the electron beam will strike different portions of the screen 24 as the latter oscillates. Also, it is well known that the electron beam is caused to converge to a point and then diverge, and for any given fixed focusing voltage on the beam the diameter of a single dot may appear smaller or larger for different Z-positions of the screen.

FIG. 2 illustrates in diagrammatic form the preferred circuit provisions for correcting these deflection and focusing errors, whereby the display may be calibrated in simple three-dimension coordinates. The various circuit elements external to the display tube 12 are associated with a pickup coil 62 (FIG. 1) fixedly mounted on the supports of the bearings 34 within the tube. A permanent magnet 64 is received within the coil 62 and rigidly attached to the plate 36 by an extension rod. Thus the pickup coil 62 generates a voltage of alternating waveform in fixed time and phase relation to the cycles of oscillation of the screen 24.

The pickup coil is connected through the header 26 with a pickup amplifier 66 (FIG. 2) having four outputs. Two of these outputs are associated with circuits for correcting the X- and Y-deflections as functions of the Z-position of the screen, and the third is associated with a circuit for correction of focus intensity.

An X-correction signal passes through an adjustable phase shift circuit 68 to an X-amplifier 70 where it is mixed with the incoming X-deflection signal applied at an X-input terminal 72. A net X-deflection signal passes over a lead 74 connected to the X-deflection plates of the gun 22 in a conventional manner. If the incoming X-deflection signal were made steady at a fixed amplitude, the net X-deflection signal would vary with the Z-position of the screen to keep the beam spot at a steady, fixed position in the X-coordinate on the screen. A Y-correction signal having a similar function passes through an adjustable phase shift circuit 76 to a Y-deflection amplifier 78 where it is mixed with the incoming Y-deflection signal applied at a Y-input terminal 80. A net Y-deflection signal passes over a lead 82 connected to the Y-deflection plates of the gun in a conventional manner.

A focus diameter and intensity correction signal passes through an adjustable phase device 84 to a mixing circuit 86 associated with a conventional beam power supply 88. A focus correction signal passes over a lead 90 to a focusing anode of the gun 22 which, as previously indicated, is of conventional form. The focus signal varies with the Z-position of the screen to keep the diameter and intensity of the beam spot on the screen constant throughout the cycle of oscillation of the latter.

In addition, a screen drive circuit 92 is connected with the stator winding 60 of the motor 58 to cause the screen 24 to oscillate in a periodic manner.

In addition to the X- and Y-input terminals 72 and 80, there is provided a Z-input terminal 94 connected with a Z-amplifier 96. This signal externally applied to the terminal 94 has an amplitude which is a function of the Z-position of a given dot to be displayed. If the dot is to be stationary or is to move relatively slowly in the Z-dimension, the incoming signal is substantially a direct-current signal of corresponding constant or slowly varying amplitude. The amplifier 96 is connected with a Z-gate circuit 98. The pickup amplifier 66, which receives from the pickup coil 62 a voltage of alternating waveform as described above, preferably generates pulses in predetermined time and phase relation to this alternating waveform. These pulses are also sent to the Z-gate circuit 98. A single pulse is generated for each cycle of screen oscillation. The circuit 98 preferably includes an electronic phase-shifting network of conventional form with provision for shifting these pulses by times up to one-half cycle of screen travel, the amount of the shift being directly related to the amplitude of the signal from the amplifier 96. Thus the output of the Z-gate circuit 98 is a phase-shifted pulse which gates the beam "on" to form a spot on the screen 24 when the screen is in a Z-position corresponding to the amplitude of the signal at the terminal 94. The circuit 98 compares the amplitude of the signal from the amplifier 96 with the amplitude of the signal from the pickup amplifier 66. When the screen 24 reaches the Z-position at which the dot is to be displayed, the compared voltages are momentarily equal, and a short gate pulse passes over a lead 100 to the Z-drive circuit 102 of the tube. This circuit is connected by a lead 104 with the control grid of the gun 22, whereby the electron beam is gated "on." Thus the dot appears within the display tube in the appropriate position corresponding to the instantaneous values of the X, Y and Z input signals. The dot reappears in the same position once for each cycle of the screen.

FIG. 3 illustrates a specific application of the apparatus of FIGS. 1 and 2 to air traffic intelligence and control apparatus at an airport. This apparatus uses a storage tube 106 of well-known type employing a storage matrix 108 capable of maintaining discrete levels of charge at discrete positions thereon. The tube employs a writing gun 110 and a reading gun 112, whereby the writing gun may place at any X- or Y-position on the screen 108 a charge having a value which is a function of a corresponding Z-coordinate. A ground radar 114 having an antenna 116 generates short X- and Y-coordinate pulses of amplitudes corresponding to the X- and Y-positions of an aircraft, and these pulses are connected by leads 118 to the appropriate deflection plates of the writing gun 110. The ground radar 114 also transmits pulses which are a function of the range of the aircraft over a lead 120 to an altitude computer 122. The altitude computer is of conventional construction and computes the altitude of the aircraft by taking into consideration its range and the elevation of the antenna 116 at the instant in which it is directed at the aircraft. An altitude signal thus generated is connected by a lead 124 to the writing gun of the storage tube 106, and determines the magnitude of the charge stored on the screen 108 in the position determined by the X- and Y-coordinates corresponding to the aircraft.

The storage tube 106 serves to isolate the radar apparatus from the display tube and its associated circuits. Thus, because of the persistence of the signal charge or charges on the screen 108, the sweep circuits of the radar and display tube are independent and do not require synchronization.

The reading gun 112 of the storage tube and the gun 22 of the display tube 12 are both connected with an X-Y sweep generator 126 which causes the beams to follow synchronously a raster-type scanning path over the screens 108 and 24, respectively. Each time the reading beam impinges upon a position on the screen 108 in which a signal charge is scored, a Z-signal passes over a lead 130 to a Z-gate circuit 132. The amplitude of the Z-signal is a function of the magnitude of the detected charge on the screen 108.

The motor 58 is driven by a screen drive circuit 134. The motor speed determines the pickup signal, which establishes the time base for the reading gun and display tube circuits described above. Thus oscillation of the screen 24 generates a Z-pickup signal in the coil 62 which passes over a lead 136 and a lead 137 to the X-Y sweep generator 126, thereby locking the sweep circuits of the reading gun and display tube in synchronism with the screen oscillations and preventing slight variations in the latter from affecting the display. The Z-pickup signal generates X-deflection, Y-deflection, and Z-focus error correction signals by the means discussed above in connection with FIG. 2, the appropriate circuits being subsumed under the general heading of an X-Y-Z error modulator 138. An additional circuit 139 connects a part of the Z-pickup signal to the screen drive circuit 134 to provide a closed feedback loop for maintaining constant screen oscillation frequency.

When the magnitudes of the Z-input signal on the lead 130 and the Z-pickup signal on the lead 136 are equal, the Z-gate circuit 132 sends a short Z-gate pulse over a lead 140 to the control grid of the display tube. Thus a luminous spot is placed in the appropriate X-, Y-, and Z-coordinate position corresponding to the physical position of the given aircraft.

The above-described general conditions for proper operation of the display tube are met as illustrated by the following example. We may assume for simplicity that a single-target aircraft will be at any one of ten discrete altitudes from 1,000 to 10,000 feet. Assume also that the reading gun 112 will recognize any one of the ten corresponding discrete levels of charge placed on the storage tube screen 108 by the altitude signals from the computer 122. The oscillating screen 24 passes sequentially through ten corresponding discrete Z-positions, each of which corresponds to a discrete value of Z-pickup voltage on the lead 136. One complete X-Y scanning frame of the X- and Y-deflection plates of the guns 112 and 22 is generated during the period that the screen 24 passes through each of these ten discrete positions in each half-cycle of oscillation. If the aircraft generates a charge of six units when it is detected at 6,000 feet, a Z-signal of corresponding magnitude on the lead 130 will be presented to the Z-gate circuit 132 ten times per half cycle of screen travel.

However, a Z-gate pulse on the lead 140 will be obtained only during the single time when the screen is at the level producing a Z-pickup signal on the lead 136 equal to this Z-signal.

The foregoing example is simplified for the purpose of explanation. In actual practice, the levels would be integrated into a smooth, continuous function. Actual resolution on all axes would be a function of the parameters of the radar set, the storage tube, the display tube, the system bandwidth, and other factors, as will be apparent to one skilled in the electronic arts.

From the foregoing, it will be evident that a new and useful three-dimensional display tube of the cathode ray type and associated circuits have been provided. The tube is quiet and extremely fast in operation, and finds application in intelligence and control apparatus concerned with rapidly moving or stationary objects.

Having thus described the invention, I claim:

1. A radar-operated position indicating system having, in combination, a cathode ray storage tube having a storage screen, a writing gun and a reading gun, an altitude computer, a radar unit to furnish signals to the computer and range X- and Y-deflection signals to the writing gun, said signals corresponding to aircraft positions, the computer having a circuit to produce a signal connected to said writing gun to produce a charge on said screen which is variable in magnitude as a function of the altitude of the aircraft, a display tube having a display gun, a screen oscillating substantially in a direction normal to its surface and a Z-pickup device operated by movement of the oscillating screen, a sweep generator synchronously operating the sweep circuits of the reading and display guns, and a Z-gate circuit connected to receive a signal from the reading gun corresponding to the amplitude of the charge stored on the storage screen, to receive a signal from the Z-pickup device which varies as a function of the position of the oscillating screen, and to gate the beam of the display tube at the moment when the received signals are in a predetermined relationship.

2. A cathode ray tube having, in combination, an enclosure having a transparent window and defining an evacuated envelope, a screen coated with a phosphor and supported within the envelope in position to be viewed through said window, mechanism to oscillate the screen within the envelope periodically in a direction substantially normal to the surface of the screen and to the direction of viewing, a variable inductance device mechanically connected to said mechanism to generate a signal in synchronism with the oscillations of the screen, and means to actuate said mechanism to oscillate the screen in said direction periodically.

3. A three-dimensional display system having, in combination, a cathode storage tube provided with a screen on which position data are stored as charges of magnitudes varying with a first coordinate, said charges being positioned on said screen as functions of a second and a third coordinate in the plane thereof, a reading gun for the storage tube, a display tube having a display gun, a screen oscillating substantially in a direction normal to its surface and a Z-pickup device operated by movement of the oscillating screen in said direction, a sweep generator synchronously operating the sweep circuits of the reading and display guns, and a Z-gate circuit connected to receive a signal from the reading gun corresponding to the amplitude of the charge stored on the storage screen, to receive a signal from the Z-pickup device which varies as a function of the position of the oscillating screen, and to gate the beam of the display tube at the moment when the received signals are in a predetermined relationship.

4. The combination according to claim 3, wherein the Z-pickup device is connected to the sweep generator and controls the output thereof.

5. A three-dimensional display system having, in combination, a display tube having a display gun, a screen oscillating substantially in a direction normal to its surface and a Z-pickup device operated by movement of the oscillating screen in said direction, a sweep generator for generating a raster on said screen, an input device for generating a signal synchronized with said raster, said signal including a Z-signal which is short in comparison with the period of oscillation of the screen and varying in amplitude with the magnitude of a first coordinate of an object to be displayed and located in said raster according to second and third coordinates of said object, and a Z-gate circuit connected to receive said Z-signal and a signal from the Z-pickup device and to gate the beam of the display tube at the moment when the received signals are in a predetermined relationship.

6. The combination according to claim 5, wherein the Z-pickup device is connected to the sweep generator and controls the output thereof.

7. A cathode ray device having, in combination, an evacuated sealed enclosure having a transparent window, a screen element within the enclosure coated with a phosphor and having a surface portion visible through said window, said element being mounted for movement relative to the window, a motor having a rotor within the enclosure and a stator outside the enclosure, said stator being positioned for inductive coupling to the rotor through the wall of the enclosure, mechanism within the enclosure connected to said rotor and screen element and adapted upon continuous rotation of said rotor to produce a reciprocative periodic movement of said visible surface portion in a direction normal thereto, an electron gun supported within the enclosure in position to project an electron beam on to said visible surface portion, said gun having X-deflection and Y-deflection means to direct the beam to a selected part of said visible surface portion, a circuit connected to the stator to generate a varying inductive field between the stator and the rotor to cause continuous rotation of the rotor, and a circuit connected to said gun to gate the beam for an interval which is short in comparison with the period of said reciprocative movement, said circuit having provision to vary the phase between said reciprocative movement and said interval.

8. A cathode ray device having, in combination, an evacuated sealed enclosure having a transparent window, a screen element within the enclosure coated with a phosphor and having a surface portion visible through said window, said element being mounted for movement relative to the window, a motor having a rotor within the enclosure and a stator outside the enclosure, said stator being positioned for inductive coupling to the rotor through the wall of the enclosure, mechanism within the enclosure connected to said rotor and screen element and adapted upon continuous rotation of said rotor to produce a reciprocative periodic movement of said visible surface portion in a direction normal thereto, an electron gun supported within the enclosure in position to project an electron beam on to said visible surface portion, said gun having X-deflection and Y-deflection means to direct the beam to a selected part of said visible surface portion, a circuit connected to the stator to generate a varying inductive field between the stator and the rotor to cause continuous rotation of the rotor, a Z-pickup device operated by movement of the rotor to generate an alternating signal synchronized with and having the same frequency as said reciprocative movement, and a circuit actuated by said signal and connected with said gun to gate said beam for an interval which is short in comparison with the period of said reciprocative movement, said circuit having provision to vary the phase between said signal and said interval.

9. The combination according to claim 7, in which said mechanism includes slide rod bushings secured to the enclosure walls, slide rods received in the bushings and secured to the screen element, and a crank pivotally connected between said rods and the rotor, whereby said screen element is reciprocated in a substantially rectilinear direction normal to said visible surface portion.

10. The combination according to claim 7, in which said mechanism includes slide rod bushings secured to the enclosure walls, slide rods received in the bushings and secured to the screen element, a flywheel mounted on the shaft of the rotor, and a crank pivotally connected between said rods and the flywheel, whereby said screen element is reciprocated in a substantially rectilinear direction normal to said visible surface portion.

11. A cathode ray tube having, in combination, an enclosure having a transparent window and defining an evacuated envelope, a screen coated with a phosphor and supported within the envelope in position to be viewed through said window, mechanism to oscillate the screen within the envelope periodically in a direction substantially normal to the surface of the screen and to the direction of viewing, pickup means operative by relative movement of the screen and the envelope to generate a signal in synchronism with the oscillations of the screen and variable in magnitude with the position of the screen in said direction, an electron gun supported within the envelope in position to project an electron beam on to the screen, means to actuate said mechanism to oscillate the screen in said direction periodically, and a circuit responsive to the magnitude of said signal and connected with said gun to gate said beam at variable times in the period of oscillation of the screen.

12. A cathode ray tube having, in combination, an enclosure having a transparent window and defining an evacuated envelope, a screen coated with a phosphor and supported within the envelope in position to be viewed through said window, mechanism to oscillate the screen within the envelope in a direction substantially normal to the surface of said screen, a permanent magnet secured in fixed relation to the screen to oscillate therewith, induction pickup means associated with said magnet to generate a signal, an electron gun supported within the envelope in position to project an electron beam on to the screen, means to actuate said mechanism to oscillate the screen in said direction periodically, and a circuit actuated by said signal and connected with said gun to gate said beam at variable times in the period of oscillation of the screen.

13. A cathode ray tube having, in combination, an enclosure having a transparent window and defining an evacuated envelope, a screen coated with a phosphor and supported within the envelope in position to be viewed through said window, mechanism to oscillate the screen within the envelope periodically in a direction substantially normal to the surface of the screen and to the direction of viewing, pickup means operative by relative movement of the screen and the envelope to generate a Z-deflection signal in synchronism with the oscillations of the screen and variable in magnitude with the position of the screen in said direction, an electron gun supported within the envelope in position to project an electron beam on to the screen, said gun having X-deflection and Y-deflection means to deflect the beam to selected parts of the screen, means to actuate said mechanism to oscillate the screen in said direction periodically, external connections for the tube including connections to the X-deflection and Y-deflection means and to said pickup means, and a circuit responsive to the magnitude of said signal and connected with said gun to gate said beam at variable times in the period of oscillation of the screen.

14. The combination according to claim 13 in which said circuit superimposes X- and Y-deflection corrections corresponding to the instantaneous position of the screen upon the signals passing through the connections to the X-deflection and Y-deflection means.

15. The combination according to claim 13 in which the electron gun has a beam focusing electrode, and including a circuit associated with said pickup means to vary the focus of the beam.

References Cited in the file of this patent

UNITED STATES PATENTS

| | | |
|---|---|---|
| 2,361,390 | Ferrill | Oct. 31, 1944 |
| 2,422,937 | Szegho | June 24, 1947 |
| 2,637,023 | Peters et al. | Apr. 28, 1953 |
| 2,806,216 | Fryklund | Sept. 10, 1957 |
| 2,809,315 | Townsend et al. | Oct. 8, 1957 |